United States Patent
Kanda

(10) Patent No.: US 9,712,739 B2
(45) Date of Patent: Jul. 18, 2017

(54) FOCUSING DEVICE, CONTROL METHOD THEREFOR, STORAGE MEDIUM STORING CONTROL PROGRAM THEREFOR, AND IMAGE PICKUP APPARATUS

(71) Applicant: CANON KABUSHIKI KAISHA, Tokyo (JP)

(72) Inventor: Akihiko Kanda, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/091,313

(22) Filed: Apr. 5, 2016

(65) Prior Publication Data

US 2016/0295102 A1   Oct. 6, 2016

(30) Foreign Application Priority Data

Apr. 6, 2015 (JP) ................................. 2015-077583

(51) Int. Cl.
  *H04N 5/232*   (2006.01)
(52) U.S. Cl.
  CPC ............................... *H04N 5/23212* (2013.01)
(58) Field of Classification Search
  None
  See application file for complete search history.

(56) References Cited

U.S. PATENT DOCUMENTS

| 8,243,191 B2* | 8/2012 | Uchida | H04N 5/23212 348/353 |
| 2009/0073304 A1* | 3/2009 | Kumagai | G03B 13/30 348/345 |
| 2010/0188558 A1* | 7/2010 | Gamadia | H04N 5/23212 348/345 |
| 2010/0254691 A1* | 10/2010 | Hori | G02B 7/365 396/125 |
| 2010/0295986 A1* | 11/2010 | Hori | H04N 5/2353 348/354 |
| 2017/0064192 A1* | 3/2017 | Mori | H04N 5/23212 |

FOREIGN PATENT DOCUMENTS

JP       2010-243790 A    10/2010

* cited by examiner

*Primary Examiner* — Shahbaz Nazrul
(74) *Attorney, Agent, or Firm* — Cowan, Liebowitz & Latman, P.C.

(57) ABSTRACT

A focusing device that is capable of shortening focusing time even when contrast AR is started for an object in a defocus state. A first computation unit computes a contrast determination index that indicates contrast of an object based on an image obtained through an image pickup optical system. A second computation unit computes a focusing degree that indicates a degree of a focusing state to the object based on the image. A first setting unit sets up a contrast determination threshold according to the focusing degree. A second setting unit sets up an image pickup cycle for picking up the object according to the contrast determination index and the contrast determination threshold. A focusing unit focuses on the object by driving a focusing lens of the image pickup optical system along an optical axis based on the contrast determination index and the focusing degree.

10 Claims, 7 Drawing Sheets

FOCUSING DEVICE, CONTROL METHOD THEREFOR, STORAGE MEDIUM STORING CONTROL PROGRAM THEREFOR, AND IMAGE PICKUP APPARATUS

BACKGROUND OF THE INVENTION

Field of the Invention

The present invention relates to a focusing device, a control method therefor, a storage medium storing a control program therefor, and an image pickup apparatus, and in particular, relates to a technique about autofocus (AF) used in an image pickup apparatus.

Description of the Related Art

In general, an image pickup apparatus, such as a digital camera and a video camera, uses what is called contrast AF that detects an in-focus position on the basis of contrast of an image pickup signal obtained from an image pickup device, such as a CCD and a MOS sensor. In the contrast AF, a contrast evaluation value that shows a degree of contrast is computed on the basis of an image pickup signal obtained as a result of photographing while moving a focusing lens along an optical axis. Then, the focusing lens is moved to the in-focus position at which the contrast is maximized along the optical axis on the basis of the contrast evaluation value concerned.

However, since the contrast AF needs to obtain the contrast evaluation value for every image pickup cycle, it is necessary to lengthen the image pickup cycle when Illuminance of an object is low. As a result, focusing time required until detecting the in-focus position increases when the illuminance of the object is low.

On the other hand, there is a method for shortening the focusing time in a low illuminance environment. For example, Japanese Laid-Open Patent Publication (Kokai) No. 2010-243790 (JP 2010-243790A) discloses a method that shortens the image pickup cycle as with the case of high illuminance when an object has high contrast even if the illuminance in a photographing environment is low.

However, according to the method disclosed in the above-mentioned publication, when the contrast AF is started for an object (a human face, for example) of which contrast varies according to a defocus amount in a low illuminance photographing environment and in a defocus state, it is determined that both of the illuminance and the contrast of the object are low. As a result, a long image pick-up cycle is set up and the focusing time required until detecting the in-focus position becomes long.

SUMMARY OF THE INVENTION

The present invention provides a focusing device, a control method therefor, a storage medium storing a control program, therefor, and an image pickup apparatus, which are capable of shortening focusing time even when contrast AF is started for an object in a defocus state.

Accordingly, a first aspect of the present invention provides a focusing device including a first computation unit configured to compute a contrast determination index that indicates contrast of an object based on an image obtained through an image pickup optical system, a second computation unit configured to compute a focusing degree that indicates a degree of a focusing state to the object based on the image, a first setting unit configured to set up a contrast determination threshold according to the focusing degree, a second setting unit configured to set up an image pickup cycle for picking up the object according to the contrast determination index and the contrast determination threshold, and a focusing unit configured to focus on the object by driving a focusing lens of the image pickup optical system along an optical axis of the image pickup optical system based on the contrast determination index and the focusing degree.

Accordingly, a second aspect of the present invention provides an image pickup apparatus including an image pickup unit confgured to obtain an image of an object through an image pickup optical system, a first computation unit configured to compute a contrast determination index that indicates contrast of an object based on the image, a second computation unit configured to compute a focusing degree that indicates a degree of a focusing state to the object based on the image, a first setting unit configured to set up a contrast determination threshold according to the focusing degree, a second setting unit configured to set up an image pickup cycle for picking up the object according to the contrast determination index and the contrast determination threshold, a focusing unit configured to focus on the object by driving a focusing lens of the image pickup optical system along an optical axis of the image pickup optical system based on the contrast determination index and the focusing degree, and a recording unit configured to record the image obtained with the image pickup unit after focusing by the focusing unit.

Accordingly, a third aspect of the present invention provides a control method for a focusing device, the control method including a first computation step of computing a contrast determination index that indicates contrast of an object based on an image obtained through an image pickup optical system, a second computation step of computing a focusing degree that indicates a degree of a focusing state to the object based on the image, a first setting step of setting up a contrast determination threshold according to the focusing degree, a second setting step of setting up an image pickup cycle for picking up the object according to the contrast determination index and the contrast determination threshold, and a focusing step of focusing on the object by driving a focusing lens of the image pickup optical system along an optical axis of the image pickup optical system based on the contrast determination index and the focusing degree.

Accordingly, a fourth aspect of the present invention provides a non-transitory computer-readable storage medium storing a control program causing a computer to execute the control method of the third aspect.

According to the present invention, since the image pick-up cycle is set up according to the contrast and the focusing degree about an object, the focusing time is shortened.

Further features of the present invention will become apparent from the following description of exemplary embodiments with reference to the attached drawings.

DESCRIPTION OF THE EMBODIMENTS

Hereafter, a focusing device of an embodiment according to the present invention will be described in detail with reference to the drawings.

Figure 1:
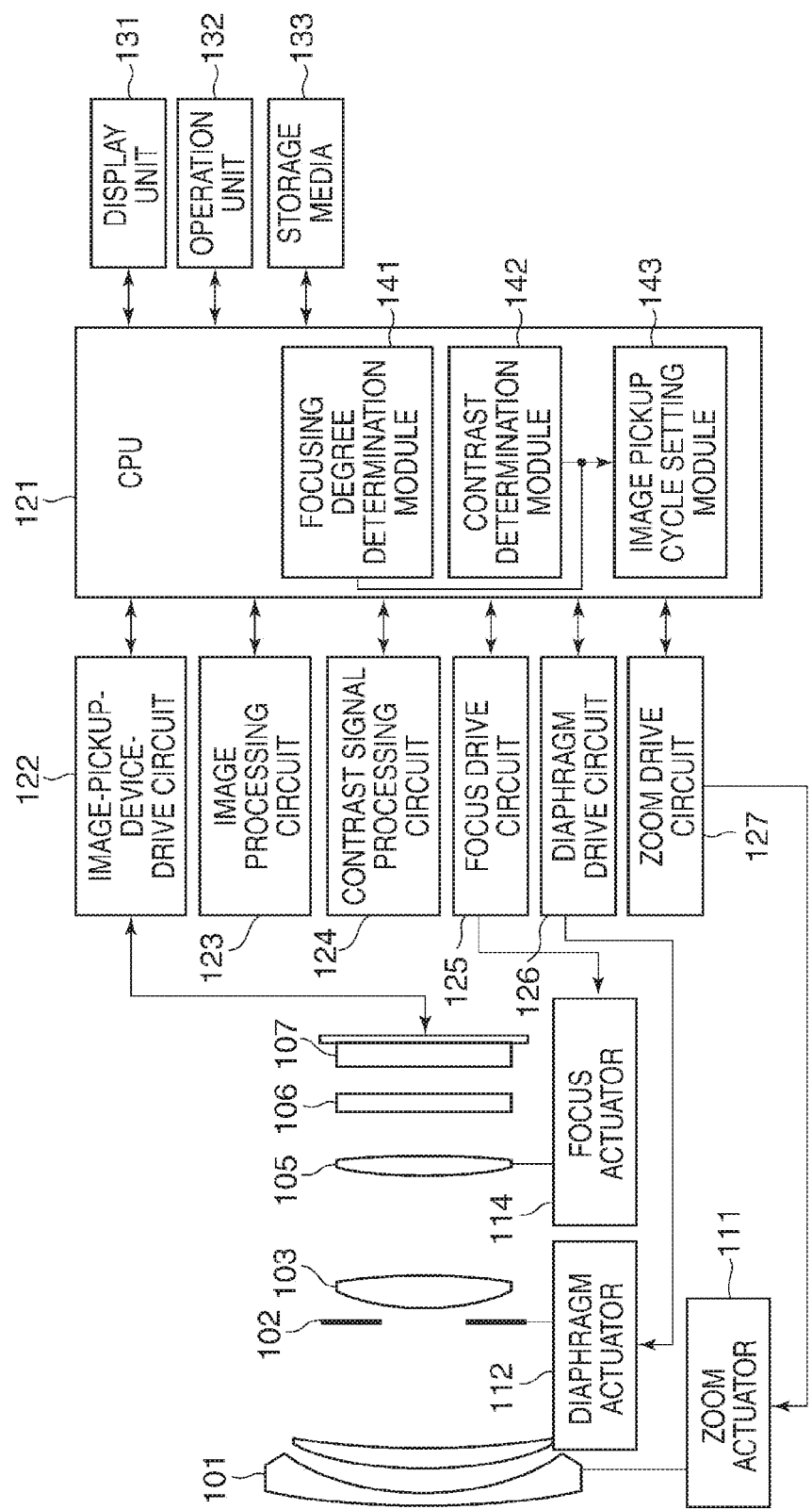
FIG. 1 is a block diagram schematically showing a configuration of an example of an image pickup apparatus (a camera) equipped with a focusing device according to an embodiment of the present invention.

FIG. 1 is a block diagram schematically showing a configuration of an example of an image pickup apparatus equipped with a focusing device according to an embodiment of the present invention.

The illustrated image pickup apparatus is a digital still camera (hereinafter referred to as a camera, simply), for example, and is constituted by a camera body and a photographing optical system (an image pickup optical system) that are united. Then, the illustrated camera is able to take and record a dynamic image and a still image.

The photographing optical system is attached to the camera body. A first lens group 101 is arranged movably along an optical axis at the front end of the photographing optical system (it is also referred to as an imaging optical system). A diaphragm 102 is arranged behind the first lens group 101. The diaphragm 102 adjusts a light amount at a time of photographing by adjusting its aperture diameter, and functions as a shutter for controlling exposure time at a time of taking a static image.

A second lens group 103 is arranged behind the diaphragm 102. This second lens group 103 is driven along the optical axis together with the diaphragm 102, and plays a variable power function (a zoom function) in conjunction with a movement of the first lens group 101. A third lens group 105 (a focusing lens) is arranged behind the second lens group 103. Then, the third lens group 105 moves along the optical axis for focusing. Furthermore, an optical low pass filter (LPF) 106 is arranged behind the third lens group 105. The optical LPF 106 is used to reduce false color and moire in an image.

An image pickup device 107 is arranged behind the optical LPF 106. This image pickup device 107 includes pixels for focus detection (focus detection pixels) other than regular pixels. Then, the image pickup device 107 is provided with a CMOS sensor and a peripheral circuit, for example.

In the illustrated example, the image pickup device 107 has a pixel section that provides M pieces of pixels in a horizontal direction (a line direction) and N pieces of pixels in a vertical direction (a column direction). These pixels are arranged in a two-dimensional matrix form. It should be noted that M and N are integers equal to or more than 2. Furthermore, a primary-color mosaic filter (hereinafter referred to as a color filter, simply) of the Bayer arrangement is formed on the pixel section in an on-chip manner. That is, the image pickup device 107 is configured as what is called a two-dimensional single plate color sensor.

The photographing optical system is constituted by the first lens group 101, the diaphragm 102, the second lens group 103, the third lens group 105, and the optical LPF 106 mentioned above.

The photographing optical system is provided with a cam barrel (not shown). When the cam barrel concerned is rotated manually, the first lens group 101 and the second lens group 103 are driven along the optical axis, which changes magnification (focal length). Furthermore, a zoom drive circuit 127 drives a zoom actuator 111 under control of a CPU 121 to rotate the cam barrel. The rotation of the cam barrel drives the first lens group 101 and the second lens group 103 in an optical axis direction, which changes the magnification.

A diaphragm drive circuit 126 drives a diaphragm actuator 112 under the control of the CPU 121 to control the aperture diameter of the diaphragm 102 in order to adjust the light amount and to adjust the exposure time at a time of taking a static image. A focus drive circuit 125 drives a focus actuator 114 under the control of the CPU 121 to drive the third lens group 105 along the optical axis for focusng.

The CPU 121 controls the entire camera and has an operation unit, a ROM, a RAM, an A/D converter, a D/A converter, a communication interface circuit, and the like that are not shown. Furthermore, the CPU 121 performs processes, such as object recognition mentioned later. The CPU 121 executes a series of photographing sequences, such as auto focusing AF), photographing, image processing, and image recording, by controlling the camera based on a predetermined program stored in the ROM.

An image-pickup-device-drive circuit 122 controls an image pickup action of the image pickup device 107, applies an A/D conversion to an image signal (an analog signal) that is output from the image pickup device 107, and transmits the converted image signal to the CPU 121 as image data (also referred to as an image pickup signal). An image processing circuit 123 receives image data from the CPU 121, and applies predetermined image processes, such as color interpolation, gamma conversion, and image compression, to the image data concerned. It should be noted that the image-pickup-device-drive circuit 122 drivingly controls the image pickup device 107 in an image pickup cycle set up by an image pickup cycle setting module 143 mentioned later.

A contrast signal processing circuit 124 receives image data (an image pickup signal) from the CPU 121, applies various filtering processes to the image pickup signal concerned, and generates a focusing degree and a contrast evaluation value.

Figure 2:
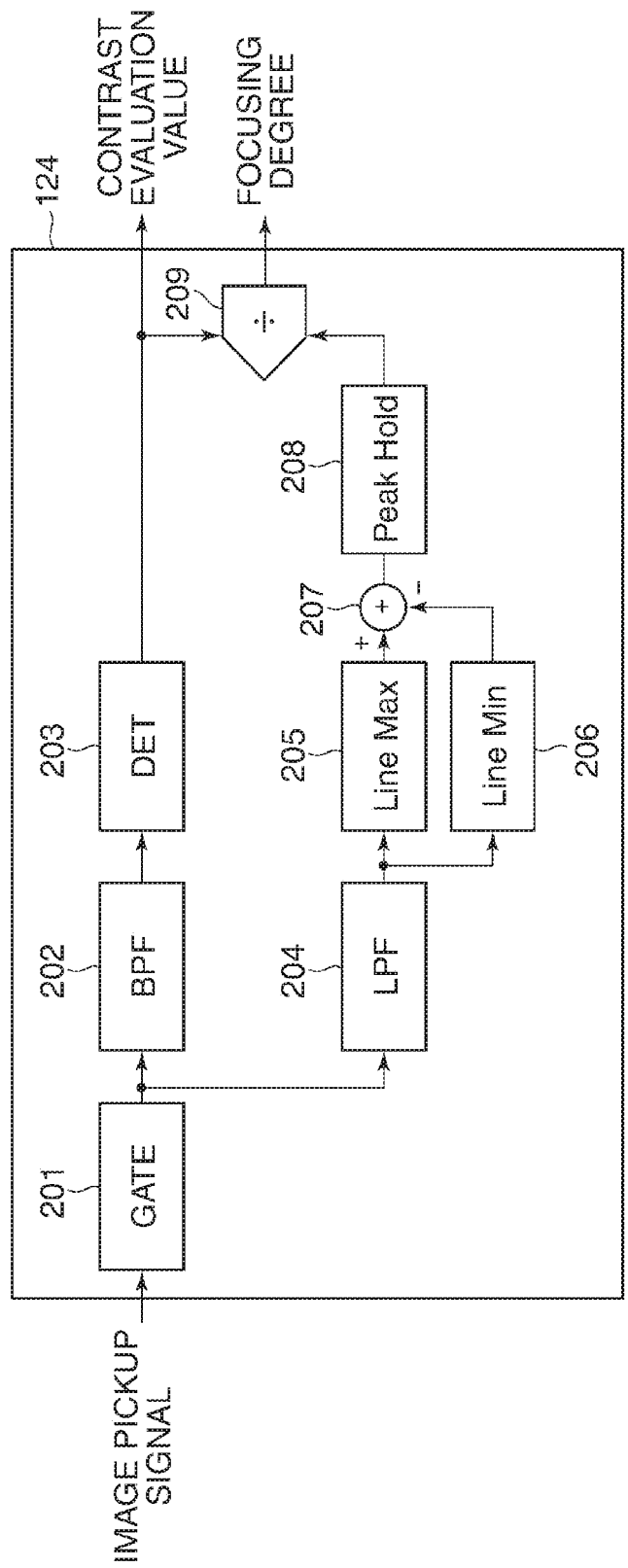
FIG. 2 is a block diagram schematically showing a configuration of an example of a contrast signal processing circuit shown in FIG. 1.

FIG. 2 is a block diagram schematically showing a configuration of an example of the contrast signal processing circuit 124 shown in FIG. 1.

The contrast signal processing circuit 124 has a gate 201, and the image data (image pickup signal) is input into the gate 210. The gate 201 extracts a signal of an evaluation area (referred to as a focus detection area) that is a target of focus detection about the image pickup signal, and outputs it as an extracted image pickup signal. Then, this extracted image pickup signal is sent to a band pass filter (BPF) 202 and a low pass filter (LPF) 204.

The BPF 202 extracts a high frequency component as a predetermined frequency component in the extracted image pickup signal. Then, the high frequency component is sent to a detection unit (DET) 203. The DET 203 detects a peak value of the high frequency component and integrates the high frequency component. The result obtained by integrating the high frequency component is made into the contrast evaluation value.

The LPF 204 removes the high frequency component from the extracted image pickup signal, and sends the result to a line maximum value unit (Line Max) 205 and a line minimum value unit (Line Min) 206. The Line Max detects the maximum value in one horizontal line output from the LPF 204. Moreover, the Line Min 206 detects the minimum value in the horizontal line. Then, an adder unit 207 finds a contrast value that shows a difference between the maximum value and the minimum value in the horizontal line.

A peak hold unit (Peak Hold) 208 detects the peak value of the contrast value in every horizontal line of the extracted image pickup signal. Furthermore, this peak value is equivalent to the maximum value of the contrast in the extracted image pickup signal that is an output of the gate 201.

The divider 209 divides the contrast evaluation value by the peak value of the contrast value that is the output of Peak Hold 208, and outputs a divided result as the focusing degree. This focusing degree shows a state of focus detection (i.e., a degree of focusing state in the focus detection area).

When the result that is obtained by integrating the high frequency component is made into the contrast evaluation value, the integration process reduces an influence of a noise etc. On the other hand, the magnitude of the contrast evaluation value in an in-focus position varies significantly according to a type of an object and image pick-up conditions (for example, an object brightness, illuminance, and a focal length).

When the focusing degree is normalized, the focusing degree in the in-focus position converges on a certain value, and the focusing degree tends to decrease as a defocus amount of an object increases. Accordingly, a focus detection process is performed using the features of the contrast evaluation value and the focusing degree in this embodiment.

Referring back to FIG. 1 again, the CPU 121 controls the focus driving circuit 125 on the basis of the contrast evaluation value and the focusing degree so as to drive the third lens group 105 along the optical axis by the focus actuator 114 for focusing.

It should be noted that the diaphragm drive circuit 126 drives the diaphragm actuator 112 to control the aperture diameter of the diaphragm 102 as mentioned above. Furthermore, the CPU 121 controls the zoom drive circuit 127 according to a zoom operation by a photographer to drive the zoom actuator 111.

The CPU 121 controls a display unit 131, such as an LCD, to display information about a photographing mode of the camera, a preview image, a confirmation image after photographing, and an image in an in-focus state at the time of the focus detection. An operation unit 132 is connected to the CPU 121. The operation unit 132 is provided with a power switch, a photographing start switch, a zoom operation switch, a photographing mode selection switch, etc. A storage media 133, such as a flash memory, is detachably attached to the camera. The storage medium 133 stores photographed images, such as a dynamic image and a static image.

As illustrated, the CPU 121 is provided with a focusing degree determination module 141, a contrast determination module 142, and the image pickup cycle setting module 143. The focusing degree determination module 141 determines the focusing degree output from the contrast signal processing circuit 124, and outputs a focusing degree determination result to the image pickup cycle setting module 143. The contrast determination module 142 determines contrast of an object. For example, the contrast determination module 142 determines the contrasts in the evaluation areas, when starting the AF, and sends a determination result (a contrast determination result) to the image pickup cycle setting module 143. The image pickup cycle setting module 143 sets up an image pickup cycle during an AF operation on the basis of the focusing degree determination result and the contrast determination result.

A pixel arrangement of the image pickup device 107 shown in FIG. 1 will be described.

As mentioned above, the color filter is arranged in the Bayer arrangement, and a Green filter component and a Red filter component are alternately arranged for pixels in an odd line. Moreover, a Blue filter component and a Green filter component are alternately arranged for pixels in an even line. Then, an on-chip micro lens is arranged on the image pickup device 107, and a photoelectric conversion section of a pixel is located under the on-chip micro lens.

The illustrated camera has first and second reading modes. In the first reading mode, signals from all the pixels of the image pickup device 107 are read. The first reading mode is the mode for picking up a high definition static image. In the second reading mode, signals from the pixels of the image pickup device 107 are thinned and read. The second reading mode is used for recording a dynamic image or displaying a preview image. For example, signals from the pixel groups are thinned in both of an X-direction (a line direction) and a Y-direction (a column direction) at a predetermined ratio in the second reading mode, which enables to read at high speed.

Subsequently, contrast AF performed by the camera shown in FIG. 1 will be described.

As mentioned above, the contrast signal processing circuit 124 computes the contrast evaluation value according to the high frequency component obtained by applying the filtering process to the image pickup signals (extracted image pickup signals) of the evaluation areas. In this embodiment, the contrast evaluation value shall be an integrated value that is obtained by accumulating the maximum values in the lines in the vertical direction while keeping the peak value for one line by extracting the high frequency component by applying the filtering process to the image pickup signals of the evaluation areas.

The contrast signal processing circuit 124 is provided with a filter with a plurality of frequency characteristics or a filter with a variable frequency characteristic. As a result of this, the frequency component extracted by the filter is changed by switching an evaluation frequency band. It should be noted that the contrast signal processing circuit 124 may compute a value about contrast other than the contrast evaluation value. For example, the maximum value of the high frequency component among the luminance levels of the image pickup signals in the evaluation areas, and a difference between the maximum value and the minimum value among the luminance levels of the image pickup signals in the evaluation areas may be employed as the other values.

Since the contrast evaluation value and the focusing degree are computed by applying the filtering process to the image pickup signals of the evaluation areas in the contrast AF, it is unnecessary to store the image pickup signals, which reduces arithmetic load. Accordingly, it is possible to process the signals of a plurality of evaluation areas simultaneously irrespective of a region of the evaluation areas in the contrast AF.

Incidentally, the contrast evaluation value obtained by the contrast signal processing circuit 124 varies according to the focusing degree. For example, the contrast evaluation value of an in-focus image becomes large, and the contrast evaluation value of a defocus image becomes small. Accordingly, the contrast evaluation value is usable as an index that indicates a focusing state of the photographing optical system. However, since a defocus amount is not detected unlike AF of what is called imaging surface phase difference detection, it is necessary to seek a focusing position at which the contrast evaluation value is maximized.

In the contrast AF, a scan operation, which moves a third lens group (the focusing lens 105) along the optical axis, is performed for detecting an in-focus position. A direction in which the scan operation increases the contrast evaluation value is found, and the focusing lens 105 is moved in the direction concerned. Then, the maximum contrast evaluation value during the scan operation is obtained, and the contrast evaluation value is obtained until the variation of the contrast evaluation value turns to decrease.

At the time of focus determination, the focusing lens position (the in-focus position) at which the contrast evaluation value is maximized is found by performing interpolating calculations according to the focusing lens positions corresponding to top three or four points (scan points) of the contrast evaluation value. Then, the focusing lens 105 is moved to the in-focus position concerned.

A cycle (i.e., a scanning cycle) that can obtain the above-mentioned contrast evaluation value is dependent on the image pickup cycle that is a reading cycle of the image pickup device 107. Accordingly, the contrast evaluation values will be obtained discretely in the scan operation. Furthermore, it is necessary to increase an acquisition frequency of the contrast evaluation value in the certain moving distance of the focusing lens in order to detect the in-focus position with sufficient accuracy. Then, when the image pickup cycle is constant, it is necessary to decrease moving speed (scanning speed) of the focusing lens 105 in order to increase the acquisition frequency of the contrast evaluation value in the certain moving distance of the focusing lens.

However, since the accuracy of detecting an in-focus position is required near the in-focus position at which the contrast evaluation value is maximized, it is enough that the scanning speed is set at a low speed near the in-focus position, and the scanning speed is not set at the low in a defocusing state. Accordingly, focusing time required to detect an in-focus position is shortened by moving the focusing lens 105 to the vicinity of the in-focus position quickly as compared with the case where the scanning speed is set at a low speed even in the defocusing state.

In the contrast AF, the contrast evaluation value is obtained while setting the scanning speed at a low speed near the in-focus position. On the other hand, the contrast evaluation value is obtained while setting the scanning speed at a high speed in a defocusing state in order to shorten the focusing time.

The focusing degree is used as an index for switching the scanning speed between the high speed in the defocusing state and the low speed near the in-focus position in order to shorten the focusing time. When the focusing degree is used as the index for switching the scanning speed, an influence due to the contrast of an object is reduced.

When contrast of an object is low, the peak value of the difference between the maximum value and the minimum value among the luminance levels of the image pickup signals of the evaluation areas that is a denominator of the focusing degree is small, and the value (the contrast evaluation value) that is obtained by integrating the peak values of the high frequency component in all the lines in the evaluation areas that is a molecule of the focusing degree is also small. On the other hand, when contrast of an object is high, the peak value of the difference between the maximum value and the minimum value among the luminance levels of the image pickup signals of the evaluation areas that is a denominator of the focusing degree is large, and the value that is obtained by integrating the peak values of the high frequency component in all the lines in the evaluation areas that is a molecule of the focusing degree is also large.

The focusing degree is normalized so as not to be influenced by contrast of an object by dividing the value that is obtained by integrating the peak values of the high frequency component in all the lines in the evaluation areas with the peak value of the difference between the maximum value and the minimum value among the luminance levels of the image pickup signals of the evaluation areas. As a result of this, when the focusing degree of an in-focus position is set to "1", the focusing degree of a boundary position between a defocusing state and a vicinity of the in-focus position at which the scanning speed is switched is set to "0.6" about any objects, for example. As a result, a defocus amount is detected while reducing the influence of the contrast of the object.

Next, the contrast AF using the focusing degree will be described. The focusing time is shortened by using the focusing degree as an index that changes the scanning speed according to the defocus amount.

Figure 3:
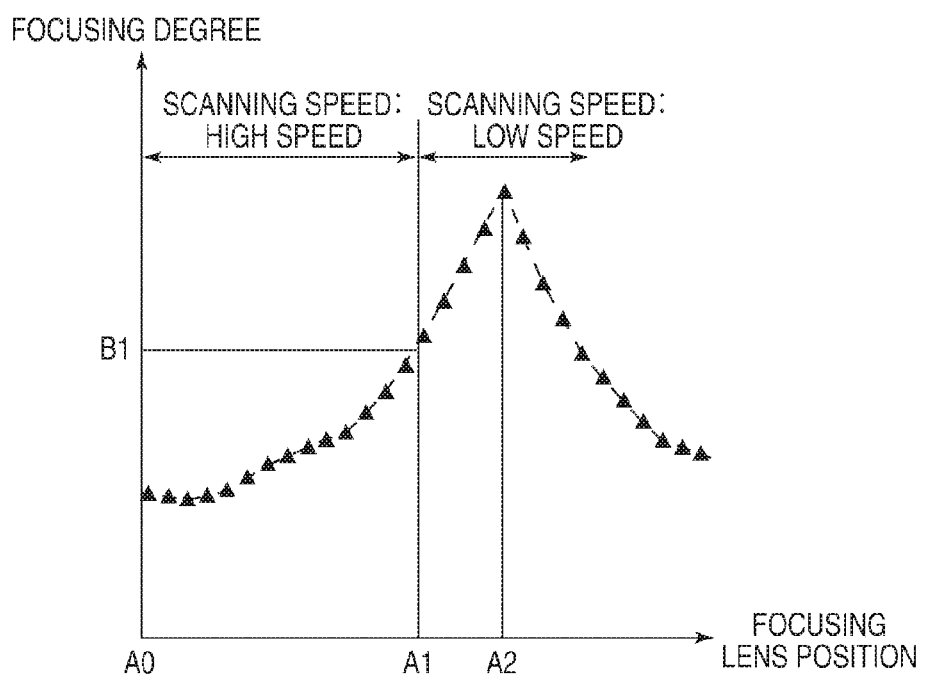
FIG. 3 is a graph showing a relationship between a position of a focusing lens (a third lens group) shown in FIG. 1 and a focusing degree.

FIG. 3 is a graph showing a relationship between a position of the focusing lens (the third lens group) shown in FIG. 1 and the focusing degree.

As shown in FIG. 3, a horizontal axis shows a position of the focusing lens and a vertical direction shows the focusing degree. The focusing lens position when the object distance is infinity is set to A0. At the focusing lens position A0, the focusing degree determination module 141 included in the CPU 121 determines that the focusing degree output from the divider 209 in the contrast signal processing circuit 124 is less than a predetermined focus threshold B1 (60% of the maximum value of the focusing degree). That is, it is a defocusing state. Then, the CPU 121 sets the scanning speed to the high speed. Then, the CPU 121 performs the scan operation, and sets the scanning speed to the low speed when the focusing lens reaches a focusing lens position A1 at which the focusing degree reaches the focus threshold B1. As a result of this, the CPU 121 change the acquisition frequency of the contrast evaluation value in the certain moving distance of the focusing lens.

Thus, when the focusing degree is less than the focus threshold B1, the CPU 121 sets the scanning speed to the high speed, and sets the scanning speed to the low speed when the focusing degree becomes more than the focus threshold. This enables to detect the in-focus position with sufficient accuracy, and to shorten the focusing time as compared with a case where the scanning speed is not changed using the focusing degree.

Figure 4:
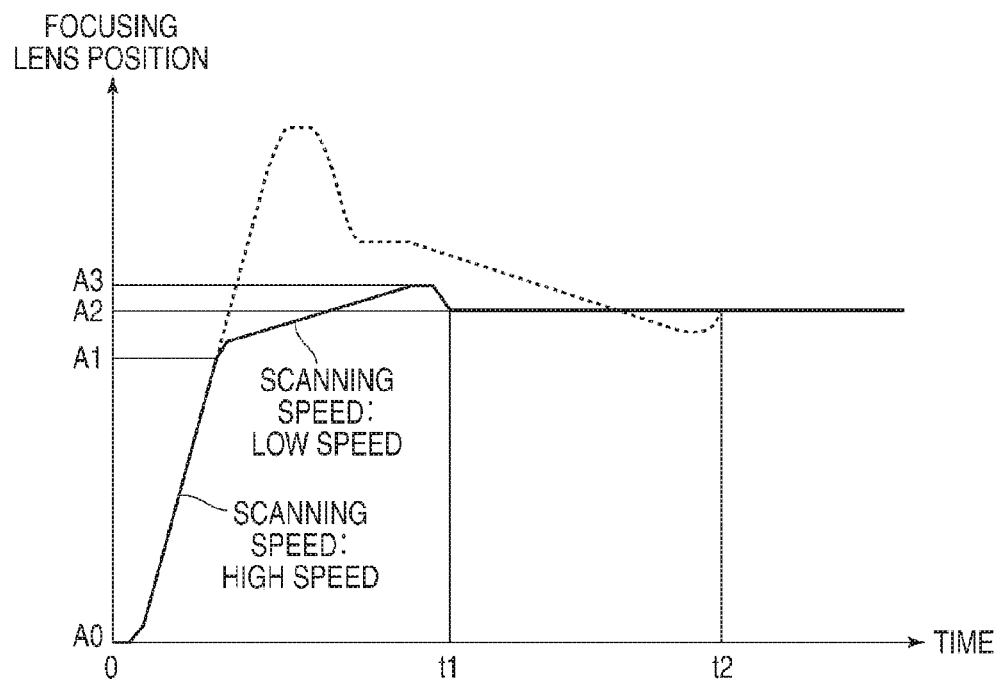
FIG. 4 is a graph for describing a focusing operation performed in the camera shown in FIG. 1.

FIG. 4 is a graph for describing the focusing operation performed in the camera shown in FIG. 1.

A horizontal axis of the graph in FIG. 4 shows time and a vertical axis shows the focusing lens position. Then, a dotted line shows behavior of the focusing lens in a case where the focusing degree is not used, and a solid line shows behavior of the focusing lens in the case where the focusing degree is used.

Assuming that the focusing lens position corresponding to an in-focus position (for example, an object distance of 2 meters) is A2, the focusing lens position A0 corresponding to infinity of the object distance is associated with time 0. The CPU 121 sets the scanning speed to the high speed from the focusing lens position A0, and performs the scan operation.

In the scan operation without using the focusing degree shown by the dotted line, the CPU 121 performs the scan operation at the high speed until the contrast evaluation value reaches the peak value. Accordingly, since the focusing lens 105 passes the in-focus position A2 at the high speed, overshoot from the in-focus position becomes large, and, moreover, the CPU 121 cannot detect the in-focus position correctly. Then, since the CPU 121 returns the focusing lens 105 back to a scan restart position and performs the scan operation again after setting the scanning speed to the low speed, the focusing time becomes time t2.

On the other hand, by the scan operation using the focusing degree shown by the solid line, the CPU 121 performs the scan operation at the high speed up to the focusing lens position A1 in front of the in-focus position. Then, the CPU 121 sets the scanning speed to the low speed from the focusing lens position A1. Since the scanning speed is set to the low speed at which the in-focus position is detected correctly in front of the in-focus position, a useless operation of the focusing lens is reduced and the focusing time becomes time t1 that is shorter than the time t2. As a result, the scan operation using the focusing degree shortens the focusing time as compared with the scan operation without using the focusing degree. It should be noted that the above description proposes the technique of changing the acquisition frequency of the contrast evaluation value in the certain moving distance of the focusing lens by switching the scanning speed between the high speed and the low speed according to the focusing degree. On the other hand, if the scanning speed is constant, the acquisition frequency of the contrast evaluation value in the certain moving distance of the focusing lens is increased by shortening the image pickup cycle. That is, the scanning speed is determined according to the focusing degree and the image pickup cycle.

Subsequently, the contrast determination performed by the contrast determination module 142 of the CPU 121 will be described.

The contrast determination module 142 sets evaluation areas in an image that an image pickup signal shows according to an object recognition result, such as a face, first. It should be noted that the evaluation areas may be set by a photographer using the operation unit 132 or may be set in a predetermined region (for example, a center region) in an image, for example.

After setting the evaluation areas, the contrast determination module 142 performs a filtering process, obtains contrast (difference between the maximum value and the minimum value among luminance values) of every line in order, and accumulates the contrasts. Although an output of a Green pixel is usually used as a luminance value, an output of a Red pixel or a Blue pixel may be used. Then, the contrast determination module 142 divides the integrated value of the contrasts with the number of lines in the evaluation areas, finds the average of the contrasts in the evaluation areas, and uses the average concerned as a contrast determination index.

When the lines are thinned in the evaluation areas, the average found with the number of lines that can be evaluated is used as the contrast determination index. Moreover, although the average of contrasts is used as the contrast determination index here, another index may be used. For example, the maximum value of the contrasts in all the evaluation areas may be used as the contrast determination index. Furthermore, the average of the large contrasts in lines in a higher rank among all the lines in the evaluation areas may be used as the contrast determination index.

A contrast determination threshold is beforehand set in the contrast determination module 142. When this contrast determination threshold is set up, the contrast determination index of a low-contrast object (for example, a contrast ratio of 90:75) is measured beforehand, and the contrast determination index concerned is used as the contrast determination threshold.

Furthermore, exposure time that satisfies a focusing accuracy is beforehand measured for each illuminance on the basis of the low-contrast object. Then, an image pickup cycle that serves suitable exposure time for AF is set according to the exposure time concerned.

The contrast determination module 142 performs a contrast determination using the contrast determination index of the low-contrast object, which is difficult to satisfy the focusing accuracy, as the contrast determination threshold. Then, the image pickup cycle setting module 143 sets up the image pickup cycle on the basis of the focusing degree determination result and the contrast determination result. Although the contrast determination index of the low-contrast object is used as the contrast determination threshold here, a contrast determination index of another object (for example, a face) may be used as the contrast determination threshold.

Next, the contrast determination of a high-contrast object (for example, the contrast ratio of 90:2) and setting of an image pickup cycle will be described.

Figure 5:
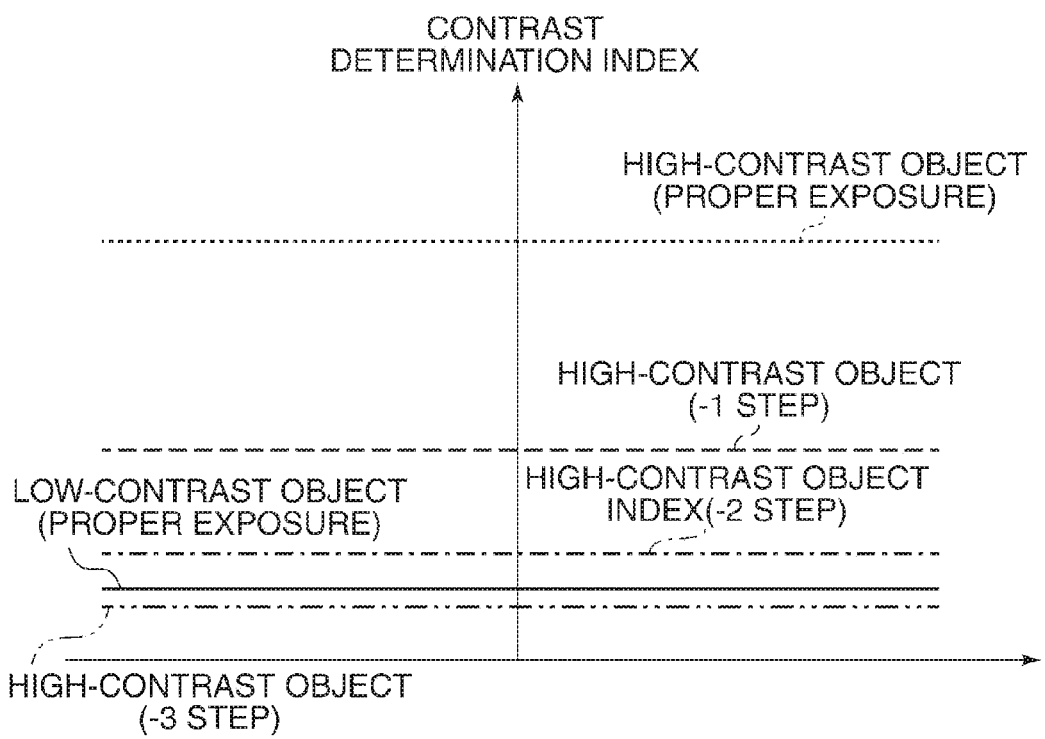
FIG. 5 is a graph for describing contrast determination and image pick-up cycle setting that are performed in the camera shown in FIG. 1.

FIG. 5 is a view for describing the contrast determination and image pick-up cycle setting that are performed in the camera shown in FIG. 1.

A vertical axis in FIG. 5 shows the contrast determination index in predetermined exposure time. A solid line in FIG. 5 shows the contrast determination index of the low-contrast object, and lines other than the solid line show the contrast determination indices of the high-contrast object. Then, a dotted line shows a proper exposure, a broken line shows exposure of "−1 step", an alternate long and short dash line shows exposure of "−2 step", and an alternate long and two short dashes line shows exposure of "—3 step".

When the image pickup cycle is set for the AF, it is determined whether the contrast determination index is equal to or more than the contrast determination threshold. In the example shown in FIG. 5, since the proper exposure (the dotted line), the exposure of "−1 step" (the broken line), and the exposure of "−2 step" (the alternate long and short dash line) exceed the contrast determination threshold, the image pickup cycle setting module 143 sets the image pickup cycle short (for example, 120 fps). On the other hand, since the exposure of "−3step" (the alternate long and two short dashes line) is less than the contrast determination threshold, the image pickup cycle setting module 143 sets the image pickup cycle long (for example, 60 fps).

It should be noted that a plurality of contrast determination thresholds may be set. For example, if a contrast determination threshold that is used to set a longer image pickup cycle (for example, 30 fps) is set up, one of three image pickup cycles will be selected according to the contrast determination index.

Thus, since the image pickup cycle for the AF is set up using the contrast of an object as a determination index, it is determined whether the camera is able to focus on the object using the contrast determination index and the contrast determination threshold, even if the image pickup cycle is set to the short exposure time of "−1 step" or "−2 step" according to the object. As a result, the time required by the AF is shortened by shortening the image pickup cycle.

Subsequently, the contrast determination about an object (for example, a face) of which contrast varies according to a defocus amount will be described.

The contrast of the object of which contrast varies according to the defocus amount becomes low in a defocusing state and becomes high in an in-focus state. Accordingly, when the object is in a defocusing state at the time of starting the AG operation, the contrast of the object is determined low, and the long image pickup cycle is set up. Accordingly, the defocusing state is determined using the focusing degree.

Figure 6:
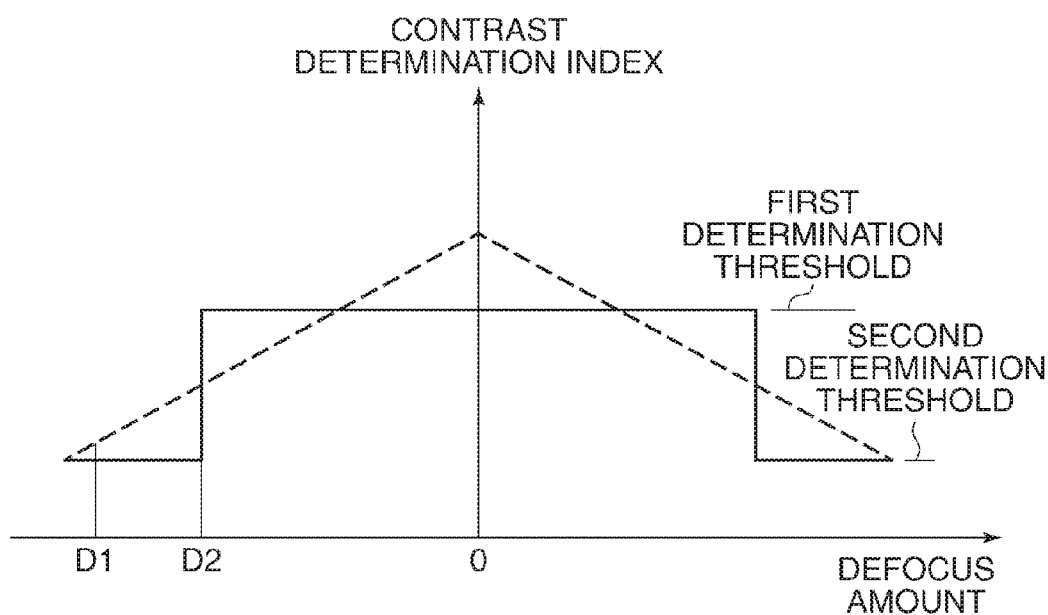
FIG. 6 is a graph showing a relationship between a contrast determination index and a defocus amount for an object of which contrast varies according to the defocus amount.

FIG. 6 is a view showing a relationship between a contrast determination index and a defocus amount for an object of which contrast varies according to the defocus amount.

A horizontal axis in FIG. 6 shows a defocus amount, and a vertical axis shows a contrast determination index. A broken line in FIG. 6 indicates variation of the contrast determination index of the object of which contrast becomes high near the in-focus position and becomes low in a defocusing state. Moreover, a solid line indicates a contrast determination threshold on the basis of the low-contrast object. In this example, a first determination threshold that is described in FIG. 5 and a second determination threshold smaller than the first determination threshold are set up.

If there were the first determination threshold only, the CPU 121 would determine that the contrast of the object was low and set the long image pickup cycle when the AF operation started from a defocusing state (a defocus amount D1 shown in FIG. 6). As a result, the focusing time cannot be shortened.

Consequently, the contrast determination threshold is changed according to the defocus amount using the focusing degree. When the defocus amount is large, the second contrast determination threshold that is smaller than the contrast determination threshold on the basis of the low contrast object described in FIG. 5 is set up. On the other hand, when the focusing lens is in the vicinity of the in-focus position in which the defocus amount is small (the defocus amount D2 shown in FIG. 6), the first determination threshold described in FIG. 5 is used. Furthermore, a third determination threshold that is smaller than the second determination threshold may be set up supposing a case where the defocus amount is larger.

However, the above-mentioned method cannot distinguish an object of which contrast is low irrespective of a defocus amount from an object of which contrast increases as the focusing lens approaches to an in-focus position from a defocusing state. Accordingly, the contrast determination index is repeatedly computed during the scan operation, and it is determined whether the contrast of the object varies according to a defocus amount on the basis of the change of the contrast determination index.

For example, when the contrast determination index monotonically increases as the focusing lens approaches to an in-focus position from a defocusing state, the CPU 121 determines that the contrast of the object increases as the focusing lens approaches to the in-focus position from the defocusing state. On the other hand, when the contrast determination index does not monotonically increase, the CPU 121 determines that the object is a low-contrast object.

Thus, the image pickup cycle is appropriately set up to the object of which contrast becomes low in the defocusing state and becomes high near the in-focus position by changing the contrast determination threshold according to the focusing degree. Moreover, the contrast determination for an object of which contrast does not change according to the defocus amount is performed by finding the amount of change of the contrast determination index and by setting up a plurality of contrast determination thresholds according to the defocus amount.

Figure 7:
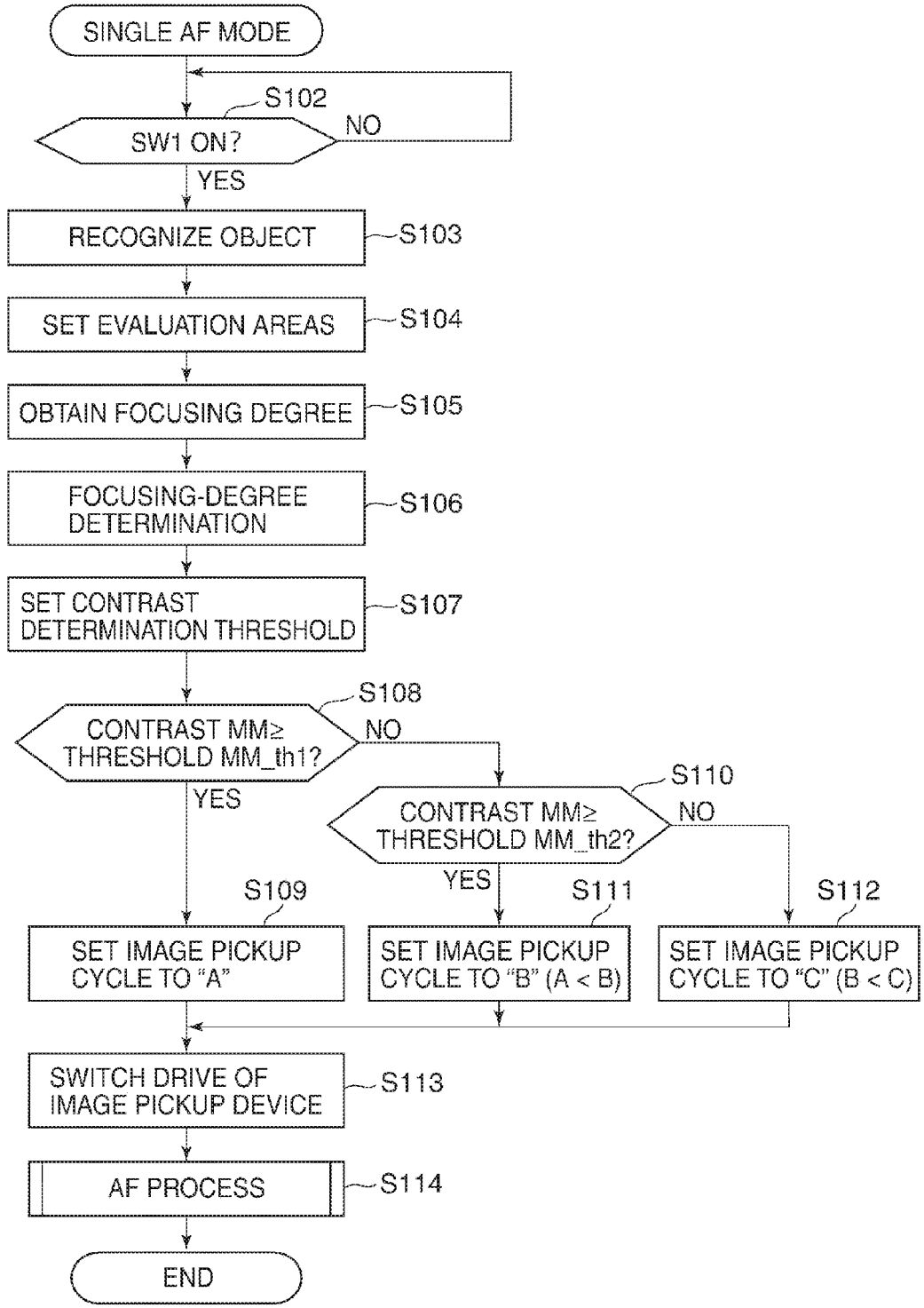
FIG. 7 is a flowchart showing operations performed by the camera shown in FIG. 1 in a single AF mode.

FIG. 7 is a flowchart showing operations performed by the camera shown in FIG. 1 in a single AF mode. It should be noted that the process of the illustrated flowchart is executed under the control by the CPU 121.

When the single AF mode is started, the CPU 121 determines whether a release button is half pressed (a SW1 turns ON?) with the operation unit 132 (step S102). When the SW1 is OFF (NO in the step S102), the CPU 120 waits.

On the other hand, when the SW1 turns ON (YES in the step S102), the CPU 121 recognizes an object (for example, a face) in an image shown by an image pickup signal (step S103). Then, the contrast determination module 142 in the CPU 121 sets evaluation areas in the image according to an object recognition result (step S104). It should be noted that the contrast determination module 142 sets the evaluation areas in a predetermined region in the image or in a region that a photographer sets up through the operation unit 132, when the object cannot be recognized or the object recognition result is not used.

Subsequently, the contrast signal processing circuit 124 obtains a focusing degree in the evaluation areas under control by the CPU 121 (step S105). Then, the CPU 121 performs focusing-degree determination according to the focusing degree with the focusing degree determination module 141, and obtains a focusing degree determination result (step S106).

Next, the CPU 121 sets up a contrast determination threshold according to the focusing degree determination result (step S107). In this case, a first determination threshold MM_th1 and a second determination threshold MM_th2 are set up as the contrast determination thresholds. These two contrast determination thresholds are set to low values when the focusing degree is less than the focus threshold, and are set to high values when the focusing degree is equal to or more than the focus threshold.

Subsequently, the CPU 121 compares the contrast determination index MM that is found as mentioned above with the first determination threshold MM_th1 with the contrast determination module 142, and determines whether MM is equal to or more than MM_th1 (step S108). When MM is equal to or more than MM_th1 (YES in the step S108), the CPU 121 sets the image pickup cycle to "A" (for example, 120 fps) with the image pickup cycle setting module 143 (step S109).

On the other hand, when MM is smaller than MM_th1 (NO in the step S108), the CPU 121 compares the contrast determination index MM with the second determination threshold MM_th2 with the contrast determination module 142, and determines whether MM is equal to or more than MM_th2 (step S110). When MM is equal to or more than MM_th2 (YES in the step S110), the CPU 121 sets the image pickup cycle to "B" (for example, 60 fps) that is longer than "A" with the image pickup cycle setting module 143 (step S111). On the other hand, when MM is less than MM_th2 (NO in the step S110), the CPU 121 sets the image pickup cycle to "C" (for example, 30 fps) that is longer than "B" with the image pickup cycle setting module 143 (step S112).

After the process in the steps S109, S111, or S112, the CPU 121 switches the drive of the image pickup device 107 to the set-up image pickup cycle with the image-pickup-device-drive circuit 122 (step S113). Then, the CPU 121 performs the AF process mentioned later (step S114), and finishes the single AF mode.

Figure 8:
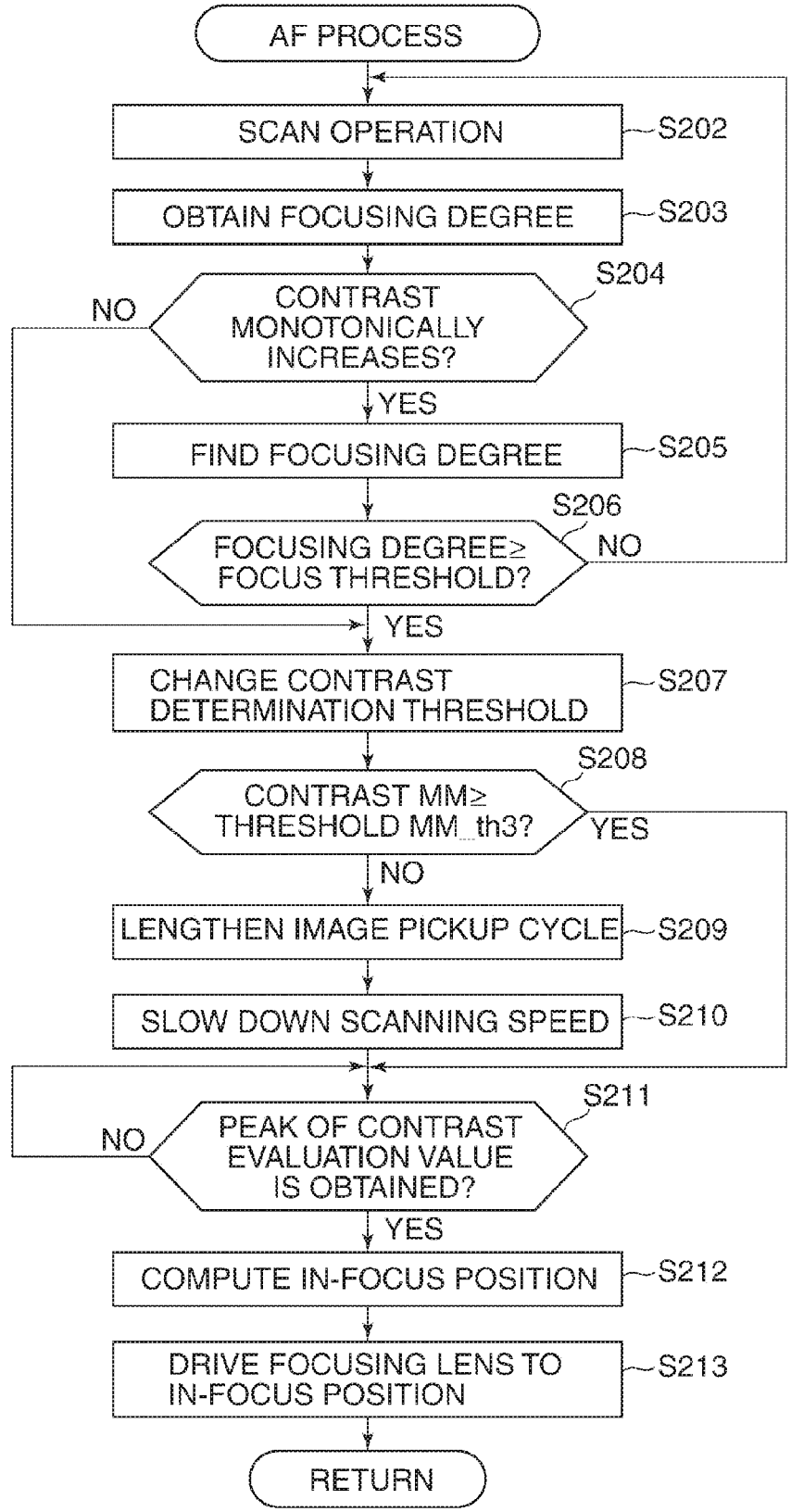
FIG. 8 is a flowchart showing an AF process shown in FIG. 7.

FIG. 8 is a flowchart showing the AF process shown in FIG. 7.

When the AF process is started, the CPU 121 starts the scan operation that drives the focusing lens 105 along the optical axis by controlling the focus driving circuit 125 (step S202). It should be noted that the scanning speed in the scan operation is set according to the image pickup cycle and the focusing degree.

Subsequently, the CPU 121 obtains the focusing degree in the evaluation areas with the contrast signal processing circuit 124 (step S203). Then, the CPU 121 determines whether the contrast monotonically increases with lapse of time on the basis of the contrast evaluation values (step S204).

When the contrast monotonically increases (YES in the step S204), the CPU 121 finds the focusing degree with the contrast signal processing circuit 124 (step S205). Then, the CPU 121 determines whether the focusing degree is equal to or more than the predetermined focus threshold with the focusing degree determination module 141 (step S206).

When the focusing degree is less than the focus threshold (NO in the step S206), the CPU 121 returns the process to the step S202, and continues the scan operation. On the other hand, when the focusing degree is equal to or more than the focus threshold (YES in the step S206), the CPU 121 sets the contrast determination threshold to a third determination threshold MM_th3 (step S207). In this case, the third determination threshold MM_th3 is less than the second determination threshold MM_th2.

When the contrast does not monotonically increase (NO in the step S204), the CPU 121 proceeds with the process to the step S207 without performing the steps S205 and S206.

Subsequently, the CPU 121 compares the contrast determination index MM with the third determination threshold MM_th3, and determines whether MM is equal to or more than MM_th3 (step S208). On the other hand, when MM is less than MM_th3 (NO in the step S208), the CPU 121 lengthens the image pickup cycle (for example, halves the flame rate) so as to be longer than the current image pickup cycle with the image pickup cycle module 143 (step S209). Then, the CPU 121 slows down the scanning speed (for example, halves the scanning speed) according to the change of the image pickup cycle (step S210).

Subsequently, the CPU 121 determines whether the peak of the contrast evaluation value is obtained during the scan operation (i.e., whether the contrast evaluation value reaches the peak) in step S211. When MM is equal to or more than MM_th3 (YES in the step S208), the CPU 121 proceeds with the process to the step 211 without changing the image pickup cycle and the scanning speed.

When the peak of the contrast evaluation value is not obtained (NO in the step S211), the CPU 121 performs the process in the step S211 again, and continues the scan operation. On the other hand, when the peak of the contrast evaluation value is obtained (YES in the step S211), the CPU 121 computes the in-focus position (step S212). Then, the CPU 121 finds the focusing lens position at which the contrast evaluation value is maximized according to the in-focus position as mentioned above, controls the focus driving circuit 125 to drive the focusing lens 105 to the focusing lens position corresponding to the in-focus position (step S213). After that, the CPU 121 finishes the AF process and finishes the single AF mode described in FIG. 7.

Figure 9:
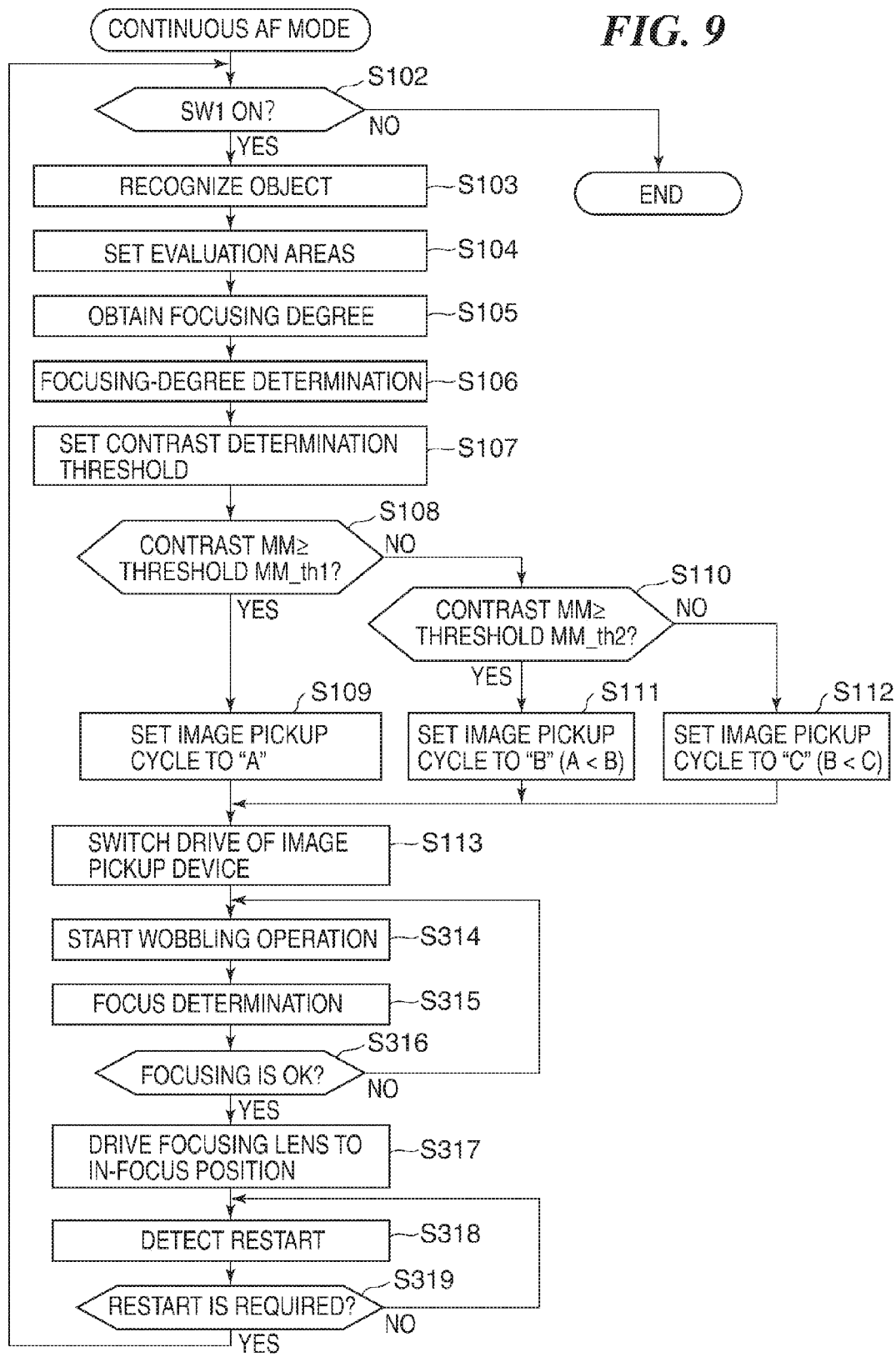
FIG. 9 is a flowchart showing operations performed by the camera shown in FIG. 1 in a continuous AF mode.

FIG. 9 is a flowchart showing operations performed by the camera shown in FIG. 1 in a continuous AF mode.

It should be noted that the camera continues the AF operation to a moving object in the continuous AF mode. Steps in FIG. 9 that are the same as the steps in the flowchart in FIG. 7 are labeled by the same step numbers, and their descriptions are omitted.

In the continuous AF mode, when the SW1 is OFF (NO in the step S102), the CPU 121 finishes the continuous AF mode. When the SW1 is ON (YES in the step S102), the CPU 121 performs the process in the steps S103 through S113 as well as the process in FIG. 7.

After changing the drive of the image pickup device 107 to the image pickup cycle set up in the step S113, the CPU 121 controls the focus driving circuit 125 to start a wobbling operation (step S314). The wobbling operation is a method of driving the focusing lens 105 in the direction to obtain the peak of the contrast evaluation value while periodically driving the focusing lens 105 back and forward in the optical axis direction at a predetermined cycle. This wobbling operation enables to continue the AF to a specific object.

Subsequently, the CPU 121 performs the focus determination of whether the peak of the contrast evaluation value is obtained (step S315). Then, the CPU 121 determines whether the focusing is OK (step S316). When the focusing is NG (NO in the step S316), the CPU 121 returns the process to the step S314, and continues the wobbling operation.

On the other hand, when the focusing is OK (YES in the step S316), the CPU 121 controls the focus driving circuit 125 to drive the focusing lens 105 to the in-focus position (step S317). Then, the CPU 121 suspends the drive of the focusing lens 105, and detects restart (step S318). The detection of restart means to detect whether the object got out of the focused state due to the movement of the object. It should be noted that the CPU 121 detects the change of the focused state according to whether the contrast evaluation value decreases.

Subsequently, the CPU 121 determines whether the restart is required (step S319). When it is determined that the restart is not required (NO in the step S319), the CPU 121 returns the process to the step S318, and detects restart. On the other hand, when it is determined that the restart is required in the step S319), the CPU 121 returns the process to the step S102, and determines whether the SW1 is ON.

In the embodiment of the present invention, since the image pick-up cycle of the image pickup device 107 is set up according to the contrast of the object and the defocus amount about the object, the focusing time is shortened.

It should be noted that the CPU 121 records the image obtained on the basis of the output from the image pickup device 107 after performing focusing onto the flash memory 133 in the illustrated camera.

Although the digital still camera is described as the image pickup apparatus in the above-mentioned embodiment, the present invention is not limited to this. The embodiment of the present invention is applicable also to a digital video camera or a digital SLR camera, for example.

As is clear from the above description, the contrast signal processing circuit 124 functions as the first computation unit, and the CPU 121 functions as the second computation unit, the first setting unit, and the second setting unit in the example shown in FIG. 1. Moreover, the CPU 121, the focus driving circuit 125, the focus actuator 114, and the focusing lens 105 function as the focusing unit.

Furthermore, the photographing optical system, the image pickup device 107, and the image-pickup-device-drive circuit 122 function as the image pickup unit, and the CPU 121 and the image processing circuit 123 function as the recording unit. It should be noted that at least the CPU 121, the contrast signal processing circuit 124, the focus driving circuit 125, the focus actuator 114, and the focusing lens 105 constitute the focusing device.

Although the embodiments of the present invention have been described, the present invention is not limited to the above-mentioned embodiments, the present invention includes various modifications as long as the concept of the invention is not deviated.

For example, the functions of the above mentioned embodiments may be achieved as a control method that is executed by the focusing device. Moreover, the functions of the above mentioned embodiment may be achieved as a control program that is executed by a computer with which the focusing device is provided. It should be noted that the control program is recorded into a computer-readable storage medium, for example.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform. the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-077583, filed Apr. 6, 2015, which is hereby incorporated by reference herein in its entirety.

What is claimed is:

1. A focusing device comprising:
   a first computation unit configured to compute a contrast determination index that indicates contrast of an object based on an image obtained through an image pickup optical system;
   a second computation unit configured to compute a focusing degree that indicates a degree of a focusing state to the object based on the image;
   a first setting unit configured to set up a contrast determination threshold according to the focusing degree;
   a second setting unit configured to set up an image pickup cycle for picking up the object according to the contrast determination index and the contrast determination threshold; and
   a focusing unit configured to focus on the object by driving a focusing lens of the image pickup optical system along an optical axis of the image pickup optical system based on the contrast determination index and the said focusing degree.

2. The focusing device according to claim 1, wherein said second setting unit shortens the image pickup cycle when the contrast indicated by the contrast determination index is equal to or more than the contrast determination threshold.

3. The focusing device according to claim 1, wherein said second setting unit changes the contrast determination threshold based on the focusing degree.

4. The focusing device according to claim 3, wherein said second setting unit changes the contrast determination threshold based on the focusing degree when the contrast indicated by the contrast determination index monotonically increases with lapse of time and the focusing degree is equal to or more than a predetermined focus threshold.

5. The focusing device according to claim 4, wherein said second setting unit changes the contrast determination threshold based on the focusing degree when the contrast indicated by the contrast determination index does not monotonically increase.

6. The focusing device according to claim 4, wherein said focusing unit changes scanning speed at which the focusing lens is driven in response to the change of the image pickup cycle by said second setting unit.

7. The focusing device according to claim 6, wherein said focusing unit slows the scanning speed when the image pickup cycle is changed so as to lengthen with said second setting unit.

8. An image pickup apparatus comprising:
   an image pickup unit configured to obtain an image of an object through an image pickup optical system;
   a first computation unit configured to compute a contrast determination index that indicates contrast of an object based on the image;
   a second computation unit configured to compute a focusing degree that indicates a degree of a focusing state to the object based on the image;
   a first setting unit configured to set up a contrast determination threshold according to the focusing degree;
   a second setting unit configured to set up an image pickup cycle for picking up the object according to the contrast determination index and the contrast determination threshold;
   a focusing unit configured to focus on the object by driving a focusing lens of the image pickup optical system along an optical axis of the image pickup optical system based on the contrast determination index and the said focusing degree; and
   a recording unit configured to record the image obtained with said image pickup unit after focusing by said focusing unit.

9. A control method for a focusing device, the control method comprising:

a first computation step of computing a contrast determination index that indicates contrast of an object based on an image obtained through an image pickup optical system;

a second computation step of computing a focusing degree that indicates a degree of a focusing state to the object based on the image;

a first setting step of setting up a contrast determination threshold according to the focusing degree;

a second setting step of setting up an image pickup cycle for picking up the object according to the contrast determination index and the contrast determination threshold; and a focusing step of focusing on the object by driving a focusing lens of the image pickup optical system along an optical axis of the image pickup optical system based on the contrast determination index and the said focusing degree.

10. A non-transitory computer-readable storage medium storing a control program causing a computer to execute a control method for a focusing device, the control method comprising:

a first computation step of computing a contrast determination index that indicates contrast of an object based on an image obtained through an image pickup optical system;

a second computation step of computing a focusing degree that indicates a degree of a focusing state to the object based on the image;

a first setting step of setting up a contrast determination threshold according to the focusing degree;

a second setting step of setting up an image pickup cycle for picking up the object according to the contrast determination index and the contrast determination threshold; and a focusing step of focusing on the object by driving a focusing lens of the image pickup optical system along an optical axis of the image pickup optical system based on the contrast determination index and the said focusing degree.

* * * * *